(12) United States Patent
Li et al.

(10) Patent No.: US 7,706,288 B2
(45) Date of Patent: Apr. 27, 2010

(54) RF CHANNEL SWITCHING IN BROADCAST OFDM SYSTEMS

(75) Inventors: Linbo Li, San Diego, CA (US); Ashok Mantravadi, San Diego, CA (US); Fuyun Ling, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 11/359,148

(22) Filed: Feb. 21, 2006

(65) Prior Publication Data

US 2007/0070963 A1    Mar. 29, 2007

Related U.S. Application Data

(60) Provisional application No. 60/721,504, filed on Sep. 27, 2005.

(51) Int. Cl.
*H04L 12/26* (2006.01)
*H04W 4/00* (2009.01)
*H04W 36/00* (2009.01)

(52) U.S. Cl. .................. 370/241; 370/331; 455/436

(58) Field of Classification Search .......... 370/338, 370/433, 437, 462, 241, 331; 455/436
See application file for complete search history.

(56) References Cited

U.S. PATENT DOCUMENTS 6,853,646 B2 *  2/2005  Alapuranen et al. ......... 370/433
7,280,164 B2    10/2007 Yen
2004/0146028 A1 *  7/2004  Hsu et al. ................... 370/335
2005/0020293 A1 *  1/2005  Moore ........................ 455/515
2005/0044561 A1 *  2/2005  McDonald .................... 725/18
2005/0163262 A1 *  7/2005  Gupta ........................ 375/343
2006/0104228 A1 *  5/2006  Zhou et al. ................. 370/328
2007/0041311 A1 *  2/2007  Baum et al. ................ 370/208
2007/0249353 A1 * 10/2007  Kang et al. ................ 455/436

FOREIGN PATENT DOCUMENTS

EP              0497115              8/1992

(Continued)

OTHER PUBLICATIONS

International Search Report, PCT/US06/037992; International Search Authority, European Patent Office, Oct. 27, 2008.

(Continued)

*Primary Examiner*—Alpus H Hsu
*Assistant Examiner*—Saad Hassan
(74) *Attorney, Agent, or Firm*—Gerald P. Joyce, III

(57) ABSTRACT

Systems and methodologies are described that facilitate monitoring RF channels in a wireless communication environment to determine whether one or more channels comprise a forward-link-only (FLO) signal. A receiver can receive a first RF channel with a FLO signal and can monitor other RF channels for FLO signals. Upon a determination that a monitored RF channel comprises a FLO signal, the receiver can switch between the first RF channel and the monitored RF channel to facilitate providing seamless reception of the FLO signal, which can be superframe synchronized between RF channels. FLO signal detection can be performed using one or more of a wide-area identification channel energy detection protocol and a wide-area overhead information symbol decoding error detection protocol.

63 Claims, 13 Drawing Sheets

FOREIGN PATENT DOCUMENTS

| | | |
|---|---|---|
| EP | 1659819 | 5/2006 |
| EP | 1919246 | 5/2008 |
| GB | 2407003 | 4/2005 |
| JP | 04280510 | 10/1992 |
| JP | 2000138566 | 5/2000 |
| WO | 9820635 | 5/1998 |
| WO | 0117125 | 3/2001 |
| WO | 0167626 | 9/2001 |

OTHER PUBLICATIONS

Written Opinion, PCT/US06/037992, International Search Authority, European Patent Office, Oct. 27, 2008.

International Preliminary Report on Patentability, PCT/US06/037992, The International Bureau of WIPO, Geneva, Switzerland, Nov. 4, 2008.

TIA: "Forward Link Only Air Interface Specification Rev. 1.1," Dec. 22, 2005.

* cited by examiner

RF CHANNEL SWITCHING IN BROADCAST OFDM SYSTEMS

CLAIM OF PRIORITY UNDER 35 U.S.C. §119

This application claims the benefit of U.S. Provisional Application Ser. No. 60/721,504 entitled "RF CHANNEL SWITCHING IN BROADCAST OFDM SYSTEMS," filed on Sep. 27, 2005, the entirety of which is incorporated herein by reference.

BACKGROUND

I. Field

The following description relates generally to wireless communications, and more particularly to monitoring and switching radio frequency channels in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Presently, a forward-link-only (FLO) signal can be transmitted to a user device over a radio frequency (RF) channel that occupies, for instance, a 6 MHz bandwidth portion in the lower 700 MHz frequency band. FLO signals can be present in more than one RF channel, for example, to accommodate multiple streams of contents. However, conventional wireless systems do not provide for monitoring and/or switching between a plurality of RF channels containing FLO signals, and the like. Thus, there exists a need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with monitoring RF channels in a wireless communication environment to determine whether one or more channels comprise(s) a forward-link-only (FLO) signal. A receiver can receive a first RF channel with a FLO signal and can monitor one or more other RF channels for FLO signals. Upon a determination that a monitored RF channel comprises a FLO signal, the receiver can switch between the first RF channel and the monitored RF channel to facilitate providing seamless reception of the FLO signal, which may be superframe synchronized between RF channels. FLO signal detection can be performed using one or more of a wide-area identification channel energy detection protocol and a wide-area overhead information symbol decoding error detection protocol.

According to one aspect, a method of detecting a forward link only (FLO) signal in a radio frequency (RF) in a wireless communication environment may comprise determining whether a monitoring condition exists and monitoring at least one new RF channel to determine whether a FLO signal is present therein. The monitoring condition may a loss-of-lock event and/or an application-initiated monitoring event. Moreover, monitoring of the at least one new RF channel may be performed according to a predetermined schedule that is continuous and/or periodic. The method can further comprise attempting to detect a time-division multiplexed (TDM) pilot, which in turn may comprise initiating a counter to zero to detect the TDM pilot, incrementing the counter, and determining whether the TDM pilot has been detected. If the pilot is not detected, the counter can be further incremented. If it is determined that the pilot has been detected, then the counter value can be compared to a value associated with the pilot to evaluate whether the counter value is greater than the pilot value. If the counter value is determined to be greater than the pilot value, then a conclusion may be drawn that a FLO signal is not present in the new RF channel. The method may further comprise evaluating an energy level associated with a wide area identification (WID) channel and determining whether the WID channel energy level is greater than a predetermined threshold level, in which case a conclusion may be drawn that a FLO signal is present in the new RF channel. If the FLO signal is present, then switching between the current and new RF channels may be initiated.

According to a related aspect, the method may comprise determining whether a decoding error has occurred during decoding of a wide area overhead information symbol (WOIS) if the WID energy level is greater than the threshold level. The method may further comprise concluding that the FLO signal is not present in the new RF channel if a decoding error has occurred, or that the FLO signal is present in the new RF channel if a decoding error has not occurred. If the FLO signal is present, then switching between the current and new RF channels may be initiated. It will be appreciated that the method may comprise either or both of the WID energy analysis protocol and the WOIS decoding error detection protocol, in accordance with one or more aspects.

Another aspect relates to a wireless communication apparatus that facilitates detecting a forward link only (FLO) signal in a monitored radio frequency (RF) channel in a wireless communication environment, comprising a receiver that monitors at least one new RF channel while receiving a FLO signal over a current RF channel, a memory that stores information related to the RF channels, and a processor, coupled to the memory, that switches between the current RF channel and the at least one new RF channel when the at least one new RF channel is determined to comprise a duplicate of the FLO signal. The receiver further comprises a FLO signal monitor that detects the flow signal in the new RF channel upon at least one of a loss-of-lock event and an application-initiated FLO detection even, and a background monitor that monitors the at least one new RF channel to determine whether a FLO signal is present therein. The background monitor receives a list of new RF channels via a control channel, and performs RF channel monitoring continuously. Additionally and/or alternatively, the background monitor may periodically attempt to detect a FLO signal in the at least one new RF channel at least once per superframe. The receiver may determine whether a wide area identification channel energy level is above a predetermined threshold level to determine whether the FLO signal is present in the at least one new RF channel. The receiver may further determine whether a decoding error has occurred during decoding of a wide area overhead information symbol to determine whether the FLO signal is present in the at least one new RF channel.

Yet another aspect relates to a wireless communication apparatus, comprising means for receiving a current RF channel comprising a FLO signal, means for monitoring a new RF channel, means for determining whether a FLO signal is present in the new RF channel, and means for switching between the current RF channel and the new RF channel when a FLO signal is determined to be present in the new RF channel. The apparatus may further comprise means for performing RF channel monitoring upon at least one of a loss-of-lock on a current RF channel and an application-initiated monitoring of the new RF channel, and means for performing background monitoring of the new RF channel, wherein the new RF channel is selected from a list of available RF channels received via a control channel. The apparatus may still further comprise means for evaluating a wide area identification (WID) channel energy level for the new RF channel, and means for comparing the WID channel energy level to a threshold level to determine whether the new RF channel contains a FLO signal. Additionally or alternatively, the apparatus may comprise means for determining whether a wide area information overhead symbol (WOIS) decoding error has occurred to assess whether the new RF channel comprises a FLO signal, in order to facilitate the foregoing, FLO signals on the current RF channel and the new RF channel may be superframe-synchronized.

Still another aspect relates to a computer-readable medium having stored thereon computer-executable instructions for receiving a first RF channel comprising a FLO signal, monitoring at least one other RF channel, determining whether a FLO signal is present in the at least one other RF channel, and switching between the first RF channel and the at least one other RF channel when a FLO signal is determined to be present in the at least one other RF channel. The computer-readable medium may further comprise instructions for performing RF channel monitoring upon at least one of a loss-of-lock on a current RF channel and an application-initiated monitoring of the at least one other RF channel, and for performing background monitoring of the at least one other RF channel, wherein the at least one other RF channel is, selected from a list of available RF channels received via a control channel. Moreover, the instructions may comprise evaluating a wide area identification (WID) channel energy level for the at least one other RF channel, and comparing the WID channel energy level to a threshold level to determine whether at least one other RF channel contains a FLO signal. Additionally and/or alternatively, the instructions may comprise determining whether a wide area information overhead symbol (WOIS) decoding error has occurred to assess whether the at least one other RF channel comprises a FLO signal. FLO signals on the first RF channel and the at least one other RF channel may be superframe-synchronized.

A further aspect provides for a processor that executes instructions for increasing throughput in a wireless communication environment, the instructions comprising receiving a first RF channel comprising a FLO signal, monitoring a second RF channel, determining whether a FLO signal is present in the second RF channel, and switching between the first RF channel and the second RF channel when a FLO signal is determined to be present in the second RF channel. The instructions may further comprise performing RF channel monitoring upon at least one of a loss-of-lock on a current RF channel and an application-initiated monitoring of a new RF channel and/or performing background monitoring of the second RF channel, wherein the second RF channel is selected from a list of available RF channels received via a control channel. The instructions may still further comprise evaluating a wide area identification (WID) channel energy level for the second RF channel, and comparing the WID channel energy level to a threshold level to determine whether the second RF channel contains a FLO signal. Additionally or alternatively, the instructions may comprise determining whether a wide area information overhead symbol (WOIS) decoding error has occurred to assess whether the second RF channel comprises a FLO signal. FLO signals on the first RF channel and the second RF channel may be superframe-synchronized to facilitate switching between the first and second RF channels when a FLO signal is present in both RF channels.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
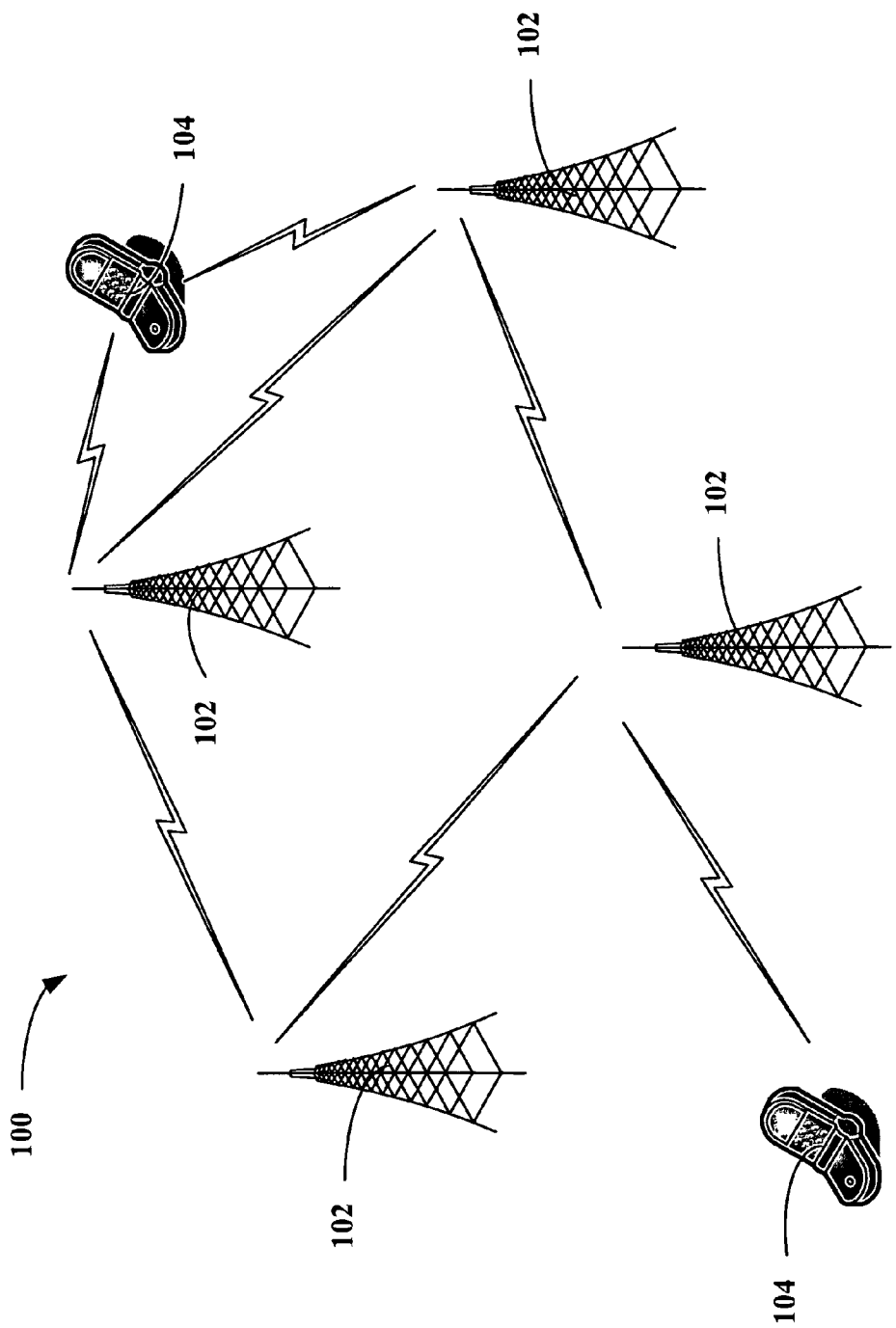
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term machine-readable medium" can include, without being limited to, wireless channels and various other media capable of storing, containing, and/or carrying instruction(s) and/or data.

Referring now to FIG. 1, a wireless network communication system 100 is illustrated in accordance with various embodiments presented herein. System 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100. System 100 can be employed in conjunction with various aspects described herein in order facilitate monitoring and/or switching between forward-link-only (FLO) channels in a wireless communication environment, as set forth with regard to subsequent figures.

For example, base stations 102 can transmit FLO signals over a plurality of different RF channels, where each base station 102 can employ one or more RF channels. Additionally and/or alternatively, a same RF channel may be utilized by more than one base station 102. User device(s) 104 can then employ one or more algorithms and/or methods (e.g., by way of a processor, computer-executable instructions, a computer-readable memory, . . . ) to monitor a plurality of the RF channels being utilized to broadcast FLO signals, and can switch between RF channels in order to improve communication throughput between one or more base stations 102 and the user device 104.

Figure 2:
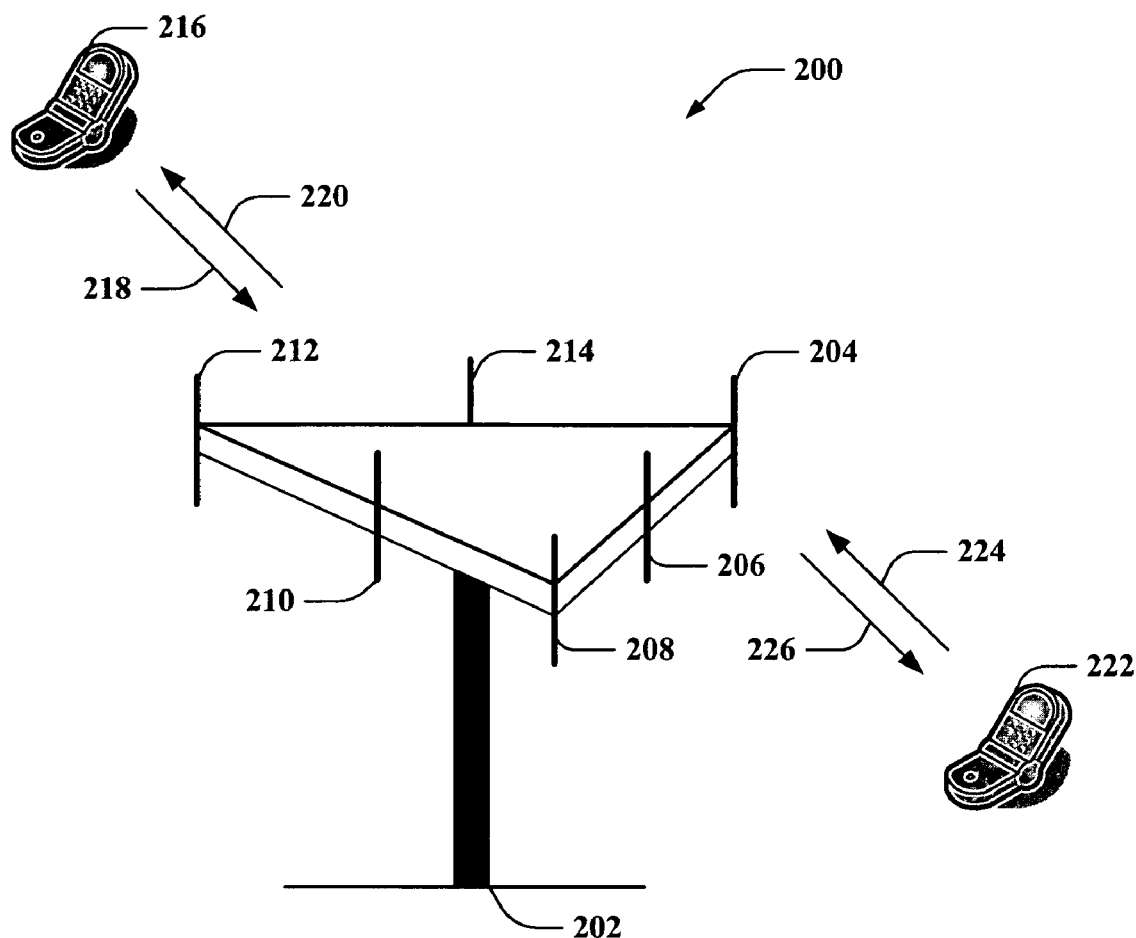
FIG. 2 is an illustration of a multiple access wireless communication system according to one or more embodiments.

Referring now to FIG. 2, a multiple access wireless communication system 200 according to one or more embodiments is illustrated. System 200 is presented for illustrative purposes and can be utilized in conjunction with various aspects set forth below. A 3-sector base station 202 includes multiple antenna groups: one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218.

Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate is often referred to as a sector of base station 202. In one embodiment, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

In accordance with one or more aspects, a user device, such as user device 216, can monitor multiple RF channels comprising FLO signals (e.g., transmitted over forward link 220, ... ) and can switch between such channels to optimize reception at user device 216. A FLO signal is typically targeted to occupy a channel of approximately 6 MHz of bandwidth in the lower 700 MHz frequency band of a communication system. When FLO signals are present in more than one radio frequency (RF) channel to accommodate more streams of contents, it can be desirable to investigate the issues of monitoring, acquiring, and switching to different RF channels. The scenarios in which a receiver (e.g., in a user device) may initiate monitoring and switching to new FLO RF channels are several. For example, the receiver can initiate monitoring and/or switching of channels upon a serious failure, such as loss of lock in the context of re-acquisition, which may occur on a current FLO RF channel. According to another example, it may be desirable to initiate and/or monitor a FLO RF channel upon initiation of an application layer. Another example relates to monitoring and/or switching new RF channels during an idle mode of a receiver. Yet another example relates to background monitoring of new RF channels (e.g., periodic, reception quality dependent, ... ).

Before initiating monitoring new channels, the receiver can be provided with a list of RF channels among which it can search for a FLO signal. This initial list can be obtained from a FLO network by decoding control channel messages. The network can broadcast RF description messages to FLO receivers through the control channel according to a predetermined schedule (e.g., once every superframe, ... ). A plurality of information fields can be defined and/or populated to facilitate providing such information to the FLO receiver. For instance, an "RFChannelCount" field can contain a number of RF channels that have FLO broadcast. Fields related to RFChannelID, Frequency, and ChannelPlan can contain information related to the channel identifier, the center frequency, and the channel bandwidth of the RF channels indicated in RFChannelCount, respectively. The receiver can search for FLO signal on these RF channel candidates and can determine if FLO broadcast is indeed available or decodable on such channels.

Figure 3:
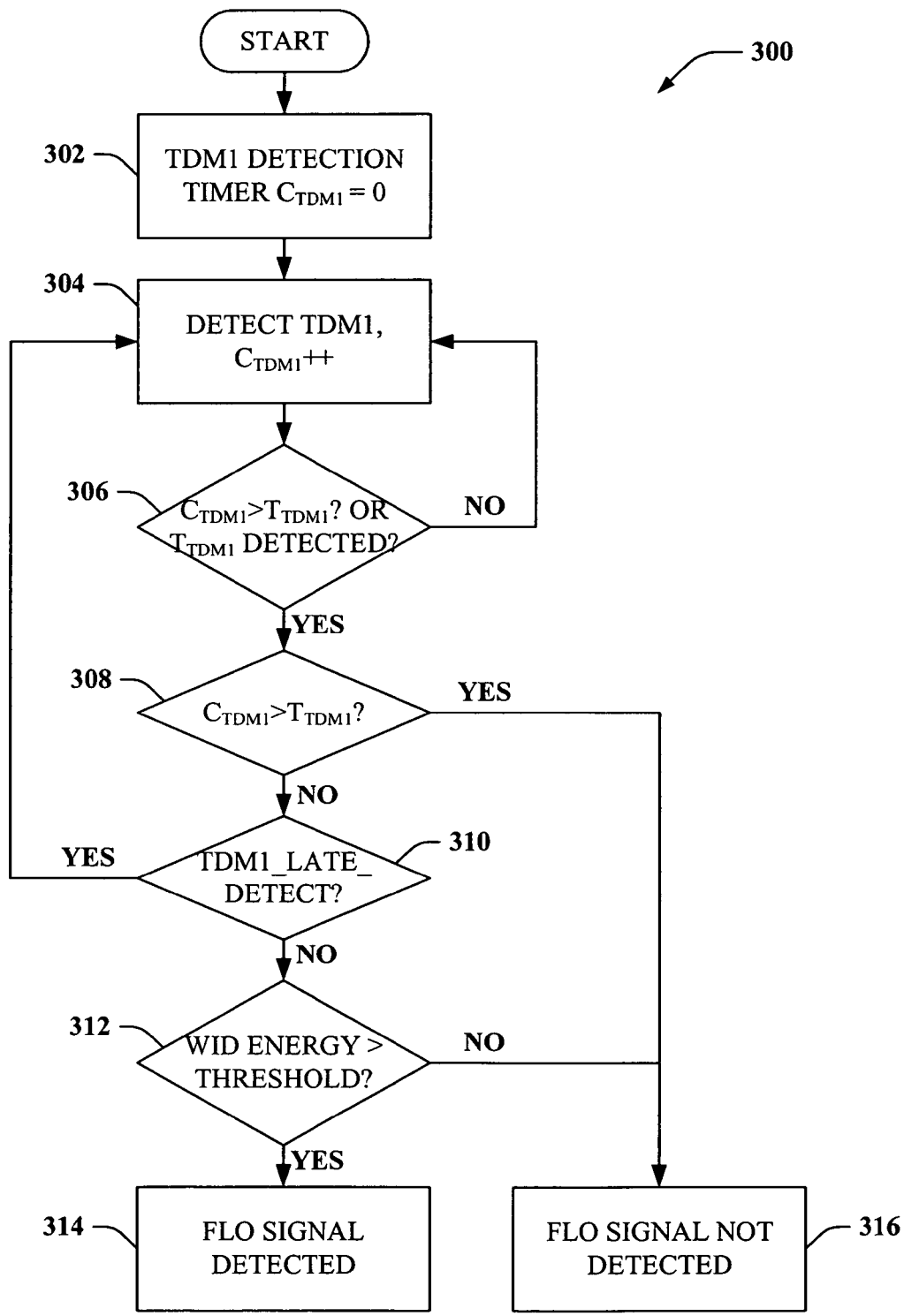
FIG. 3 is an illustration of a methodology for performing FLO signal detection in accordance with various aspects presented herein.
Figure 4:
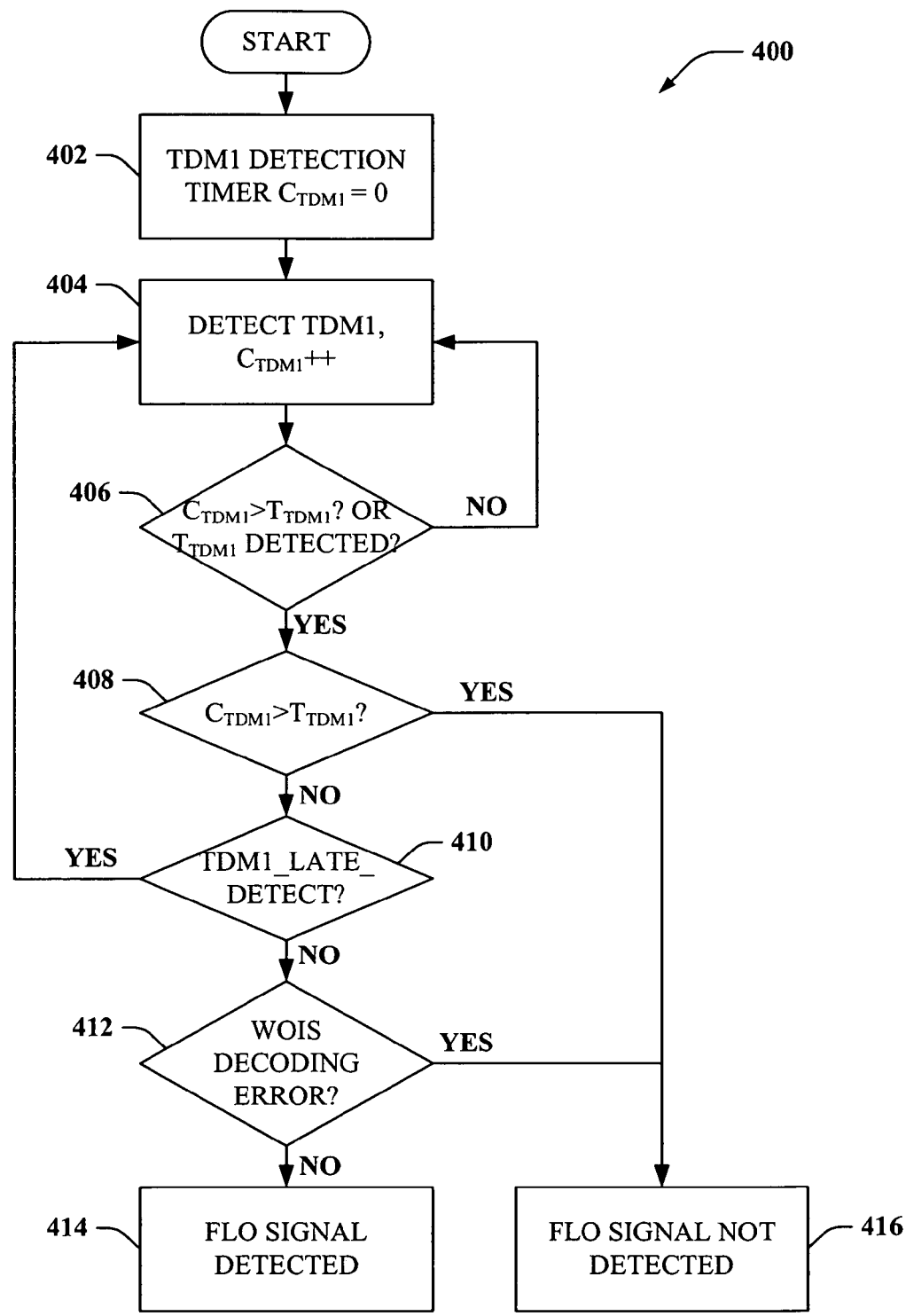
FIG. 4 is an illustration of a method for detecting a FLO signal in a wireless communication environment, in accordance with various aspects.
Figure 5:
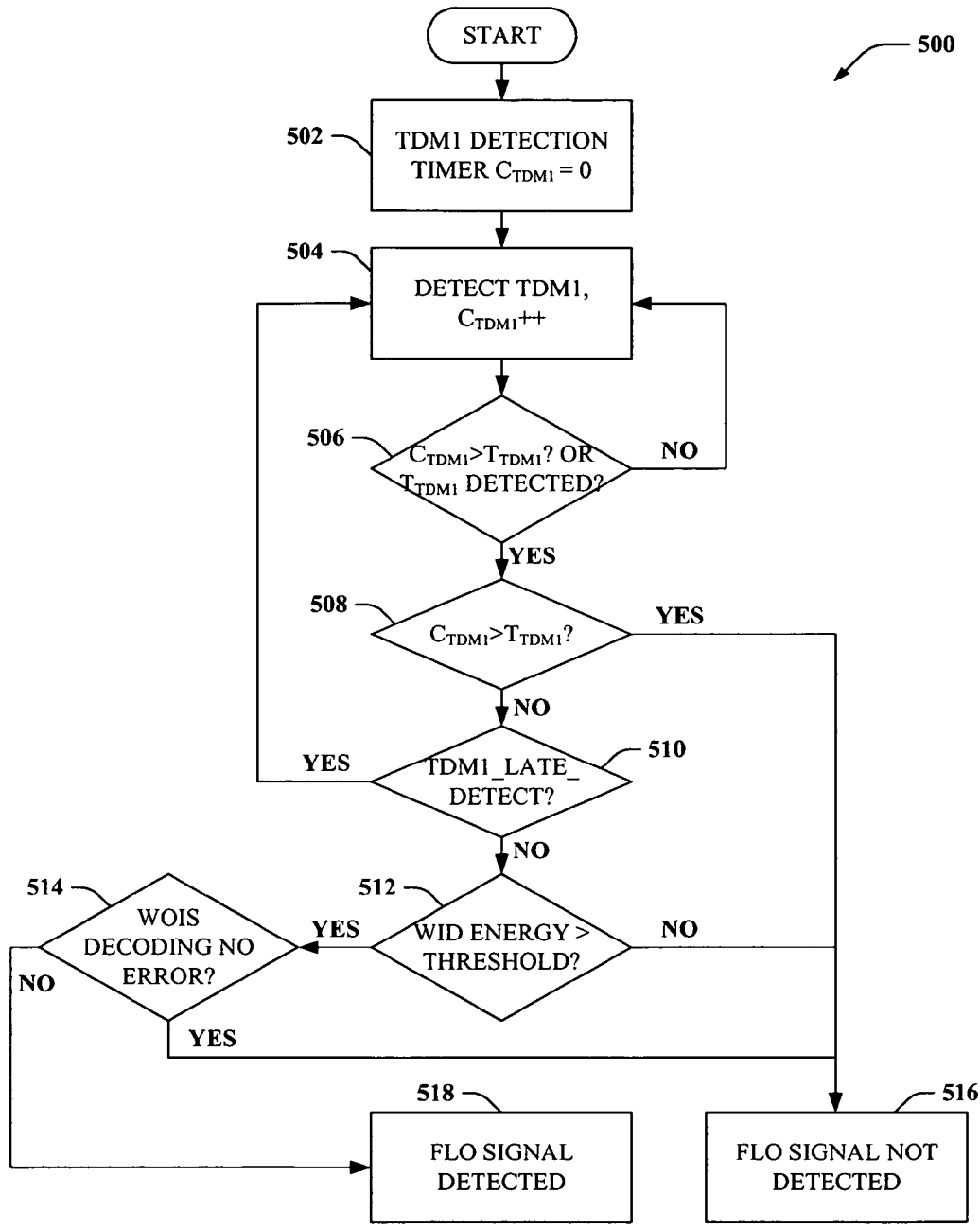
FIG. 5 is an illustration of a methodology for detecting a FLO signal, in accordance with various aspects.

Referring to FIGS. 3-5, methodologies relating to FLO signal detection are illustrated. For example, methodologies can relate to monitoring, detecting, and/or switching between FLO RF channels in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

In accordance with such methods, monitoring of new RF channels can be initiated, for instance, after a serious failure of FLO operation on a current RF channel, such as a loss of lock in the context of re-acquisition. For example, a receiver can attempt to re-acquire reception on an original RF channel (e.g., the lost channel). If signal lock is not obtained within a re-acquisition timeout for the original channel, the receiver can begin monitoring new RF channels on a candidate list obtained from control channel messages. Since lock of the original channel is already lost, it is not necessary to store and recover the key parameters of blocks such as data channel (DC), automatic gain control (AGC), automatic frequency control (AFC), and timing of the original FLO channel. The receiver can switch to a new RF channel and restart detection of a FLO signal.

FIG. 3 is an illustration of a methodology 300 for performing FLO signal detection in accordance with various aspects presented herein. In order to determine whether FLO service is available on an RF channel, FLO detection can be initiated and, at 302, a time-division multiplexed (TDM) pilot detection timer can attempt to detect a first TDM pilot (TDM1), and a timer count there for, $C_{TDM1}$, can be initiated at 0. At 304, TDM1 can be detected and the counter $C_{TDM1}$ can be incremented.

At 306, a determination can be made regarding whether the counter value is greater than the value of the pilot being sought. For instance, if the pilot being sought is TDM1, and the counter has been incremented from 0 to 1 at 304, then it will be determined that the counter value is not greater than the value of the pilot being sought (e.g., in this example the values are equal) and the method can revert to 304 for another attempt at detection of the pilot TDM1. Additionally, at 306, a determination can be made regarding whether the pilot has successfully been detected. If the determination is negative, then the method can similarly revert to 304, where pilot detection can be reattempted. If the pilot is detected, then the method can proceed to 308, where a comparison of the counter value to the value of the pilot is reevaluated. For example, if the counter value is 3 for a particular iteration of the method 300, and the pilot being sought is TDM2 (a second TDM pilot), then the counter has advanced beyond the value of the pilot being sought and the method can proceed to 316, where an indication that an FLO signal is not detected is generated. If the value of the pilot being sought is less than or equal to the counter value, then the method can advance to 310. It will be appreciated that the reevaluation of the counter and pilot value comparison at 308 need not be performed in the event that the counter value is determined to be greater than the value associated with the pilot being sought at 306 and the pilot is not detected at 306. Rather, in such a case, the method can proceed directly to 310.

At 310, a determination can be made regarding whether a late pilot detection algorithm (e.g., TDM1_LATE_DETECT) is to be employed. The late detection algorithm can be asserted after a predetermined time, $T_{TDM1}$ (e.g., TDM! Pilot detection timeout), and upon such assertion, the method can revert to 304 for pilot detection. If the late detection algorithm is not employed, then at 312, an energy level for a wide-area identity (WID) channel associated with the transmission being analyzed can be ascertained and compared to a predetermined threshold energy level. If the detected WID energy is not greater than the predetermined threshold level, then the FLO signal is not detected, at 316. If the detected WID energy is greater than the threshold value, then at 314, the FLO signal is detected. It will be understood that method 300 is iterative and can be repeatedly and/or continuously performed by, for example, a user device communicating in a wireless communication environment to facilitate FLO signal detection.

FIG. 4 is an illustration of a method 400 for detecting a FLO signal in a wireless communication environment, in accordance with various aspects. FLO detection can be initiated and, at 402, a TDM pilot detection timer can attempt to detect a TDM pilot (TDM1), and a timer count there for, $C_{TDM1}$, can be initiated and set to 0. At 404, an attempt to detect TDM1 can be made and counter $C_{TDM1}$ can be incremented. At 406, a determination can be made regarding whether the counter value is greater than the value of the pilot being sought. For instance, if the pilot being sought is TDM1, and the counter has been incremented from 0 to 1 at 404, then at 406 it can be determined that the counter value is not greater than the value of the pilot being sought, and the method can revert to 404 for another attempt at detection of the pilot TDM1. Additionally, at 406, a determination can be made regarding whether the pilot has in fact successfully been detected. If the determination is negative, then the method can similarly revert to 404, where pilot detection can be reattempted. If the determination is positive, then the method can proceed to 408, where a comparison of the counter value to the value of the pilot can be reevaluated. For example, if the counter value is 3 for a particular iteration of the method 400, and the pilot being sought is TDM2 (a second TDM pilot), then the counter has advanced beyond the value of the pilot being sought and the method can proceed to 416, where an indication that an FLO signal is not detected can be generated. If the value of the pilot being sought is less than or equal to the counter value, then the method can advance to 410. It will be appreciated that the reevaluation of the counter and pilot value comparison at 408 need not be performed in the event that the counter value is determined to be greater than the value associated with the pilot being sought at 406 and the pilot is not detected at 406. Rather, in such a case, the method can proceed directly to 410.

A determination can be made regarding whether a late pilot detection algorithm (e.g., TDM1_LATE_DETECT) is to be employed, at 410. The late detection algorithm can be asserted after a predetermined time, $T_{TDM1}$ (e.g., TDM1 pilot detection timeout), and upon such assertion, the method can revert to 404 for pilot detection. If the late detection algorithm is not employed, then at 412, a determination can be made regarding whether an error has occurred during decoding of a wide-area overhead information symbol (WOIS) in the transmission being analyzed (e.g., upon detection of a WID associated with the transmission). If an error has occurred, then the FLO signal is not detected, at 416. If no error has occurred during decoding of the WOIS, then at 414, the FLO signal is detected. It will be understood that method 400 is iterative and can be repeatedly and/or continuously performed by, for example, a user device communicating in a wireless communication environment to facilitate FLO signal detection.

FIG. 5 is an illustration of a methodology 500 for detecting a FLO signal, in accordance with various aspects. Upon initiation of FLO signal detection, a TDM1 detection timer can be initiated a TDM pilot detection timer can attempt to detect a TDM pilot (TDM1), and a timer count there for, $C_{TDM1}$, can be initiated and set to 0, at 502. At 504, TDM1 detection can be attempted and counter $C_{TDM1}$ can be incremented. At 506, a determination can be made regarding whether the counter value is greater than the value of the pilot being sought. For instance, if the pilot being sought is TDM1, and the counter has been incremented from 0 to 1 at 504, then at 506 it may be determined that the counter value is less than the value of the pilot being sought, and the method can revert to 504 for another attempt at detection of the pilot TDM1. Additionally, at 506, a determination can be made regarding whether the pilot has in fact successfully been detected. If it is determined that the pilot has not been detected, then the method can similarly revert to 504, where pilot detection can be reattempted. If the determination indicates that pilot detection was successful, then the method can proceed to 508, where a comparison of the counter value to the value of the pilot can be reevaluated. For example, if the counter value is 2 for a particular iteration of the method 500, and the pilot being sought is TDM1 (a first TDM pilot), then the counter has advanced beyond the value of the pilot being sought, and the method can proceed to 516, where an indication that an FLO signal is not detected can be generated. If the value of the pilot being sought is less than or equal to the counter value, then the method can advance to 510. It will be appreciated that the reevaluation of the counter and pilot value comparison at 508 need not be performed in the event that the counter value is determined to be greater than the value associated with the pilot being sought at 506 and the pilot is not detected at 506. Rather, in such a case, the method can proceed directly to 510.

At 510, a determination can be made regarding whether a late pilot detection algorithm (e.g., TDM1_LATE_DETECT) is to be employed. The late detection algorithm can be asserted after a predetermined time, $T_{TDM1}$ (e.g., TDM1 pilot detection timeout), and upon such assertion, the method can revert to 504 for pilot detection. If the late detection algorithm is not employed, then at 512, an energy level for a wide-area identity (WID) channel associated with the transmission being analyzed can be ascertained and compared to a predetermined threshold energy level. If the detected WID energy is not greater than the predetermined threshold level, then a conclusion may be drawn that the FLO signal is not detected, at 516. If the detected WID energy is greater than the threshold value, then at 514, a determination can be made regarding whether an error has occurred during decoding of a WOIS in the transmission being analyzed (e.g., upon detection of a WID associated with the transmission). If an error has occurred, then it may be concluded that the FLO signal is not detected, at 516. If no error has occurred during decoding of the WOIS, then at 518, a conclusion may be drawn that the FLO signal is detected. It will be understood that method 500 is iterative and can be repeatedly and/or continuously performed by, for example, a user device communicating in a wireless communication environment to facilitate FLO signal detection.

Thus, according to one or more of methodologies 300, 400, and/or 500, determining whether FLO service is available on another RF channel can be performed. All approaches first attempt to detect TDM Pilot 1 (TDM1). If TDM Pilot 1 detection fails or if TDM1_LATE_DETECT is asserted after a pre-determined period of time $T_{TDM1}$ (TDM Pilot 1 detection timeout), it may be determined that FLO service is not available on the RF channel being examined. The choice of $T_{TDM1}$ depends on the monitoring mode.

If TDM Pilot 1 is successfully detected, for WID detection, FLO signal searching method 300 compares the energy of the most probable hypothesis with a pre-determined threshold. If the WID energy is higher than the threshold, it is deemed that FLO service is available. For FLO searching method 400, after the detection of WID, the receiver proceeds to decode WOIS packets. For instance, a WOIS Turbo decoding PER may be used as the criterion for determining the presence of FLO. If the FCS (frame check sequence) does not detect any erroneous packets for WOIS at the Turbo decoder output, FLO service is declared available for the RF channel. FLO searching method 500 is a combination of methods 300 and 400. After TDM Pilot 1 detection, if the WID detection returns energy weaker than the threshold, FLO signal can be declared unavailable on the new channel. If instead the detected WID energy is higher than the threshold, the receiver continues to decode WOIS and uses the Turbo decoding PER as the detection criterion.

To save receiver power consumption, a received signal strength indicator (RSSI) on the new channel can be used as an early-exit condition. For example, after switching to the new channel and the acquisition of direct current (DC) and automatic gain control (AGC), the receiver first calculates the RSSI of the new channel based on a digital variable gain amplifier (DVGA) loop accumulator and AGC gain state information. If the RSSI is higher than a predefined threshold, the receiver may proceed to execute one of the three searching procedures (e.g., method 300, 400, or 500). If not, FLO may be declared unavailable on the new channel.

It will be appreciated that, in accordance with one or more aspects described herein, inferences can be made regarding channel monitoring, FLO signal detection, RF channel switching, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding whether to switch between RF channel frequencies based on extrinsic information, such as signal strength or the like. For instance, a power level associated with a current RF channel can be continuously and/or periodically monitored. A determination can be made (e.g., by a receiver, a processor, . . . ) that the power level is increasing as a user device moves through a sector or region of a wireless communication system (e.g., the user device is moving toward the source of the RF transmission), in which case an inference may be made that no channel switch is presently necessary. According to a related example, evaluation of the RF channel power level may indicate that channel power is decreasing as the user device moves through the coverage area (e.g., the user device is moving away from the source of the RF transmission), in which case an inference may be made that switching to a new RF channel will be imminently desirable, and actions related thereto may be initiated. Such inferences can be based on, for instance, a comparison of a detected power level to a predetermined threshold power level to assess whether channel switching is desirable. Additionally and/or alternatively, each successive power level evaluation can be compared to one or more preceding power level readings to provide power level trend information as the user device moves throughout one or more coverage areas. It will be appreciated that the foregoing example is illustrative in nature and is not intended to limit the number of inferences that can be made or the manner in which such inferences are made in conjunction with the various embodiments and/or methods described herein.

Figure 6:
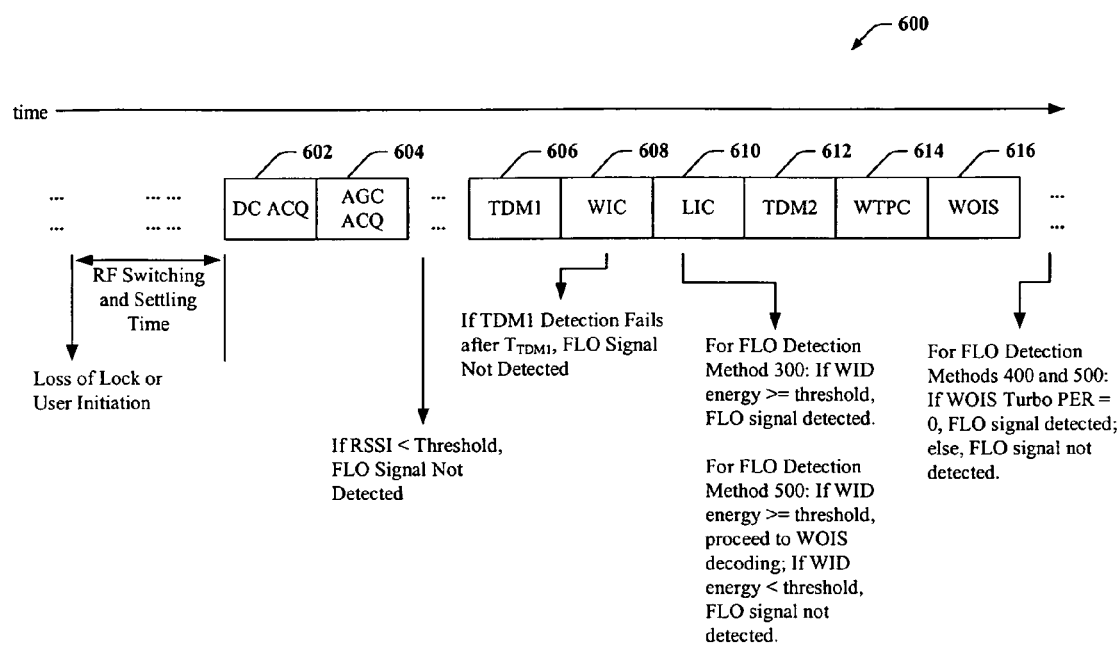
FIG. 6 is an illustration of a timeline of loss of lock based and application layer initiated monitoring methods with the proposed FLO searching schemes, according to one or more aspects.

FIG. 6 is an illustration of a timeline 600 of loss of lock based and application layer initiated monitoring methods with the proposed FLO searching schemes, according to one or more aspects. According to the figure, DC acquisition 602 may occur after a period of RF switching and settling time, which in turn may be triggered by a loss of lock or by user initiation. An AGC acquisition block 604 follows DC acquisition 602, after which a determination can be made regarding whether RSSI energy is below the predetermined threshold value. If the determination is positive, then it may be concluded that the FLO signal is not detected.

A TDM1 block 606 is illustrated, which represents a period $T_{TDM1}$, for TDM Pilot 1 detection, after which, during a WID channel (WIC) 608 transmission, FLO signal detection can be evaluated. If detection has failed as of the termination of $T_{TDM1}$, then an indication of such can be made. A local area ID channel (LIC) block 610 follows WIC block 608, during which various actions and/or assessments can be performed depending on the particular FLO signal detection scheme. For example, in conjunction with method 300, a determination can be made regarding whether detected WID energy is greater than or equal to a predetermined threshold level, in which case a conclusion can be drawn that the FLO signal has been successfully detected. According to a related example, in conjunction with method 500, if WID energy is determined to be greater than or equal to the predetermined threshold value, then WOIS decoding and analysis can be performed. Alternatively, if WID energy is determined to be below the threshold value, a determination can be made that the FLO signal has not been detected.

A TDM2 block is depicted at 612, which defines a period for detection of a TDM Pilot 2, after which a wide area transition pilot channel 614 can be evaluated to facilitate performing channel estimation for WOIS decoding at 616. For methods 400 and 500, a determination can be made regarding whether a WOIS Turbo packet error rate (PER) is equal to zero; if so, the FLO signal has been successfully detected. If not, then a conclusion may be made that the FLO signal has not been successfully detected.

Figure 7:
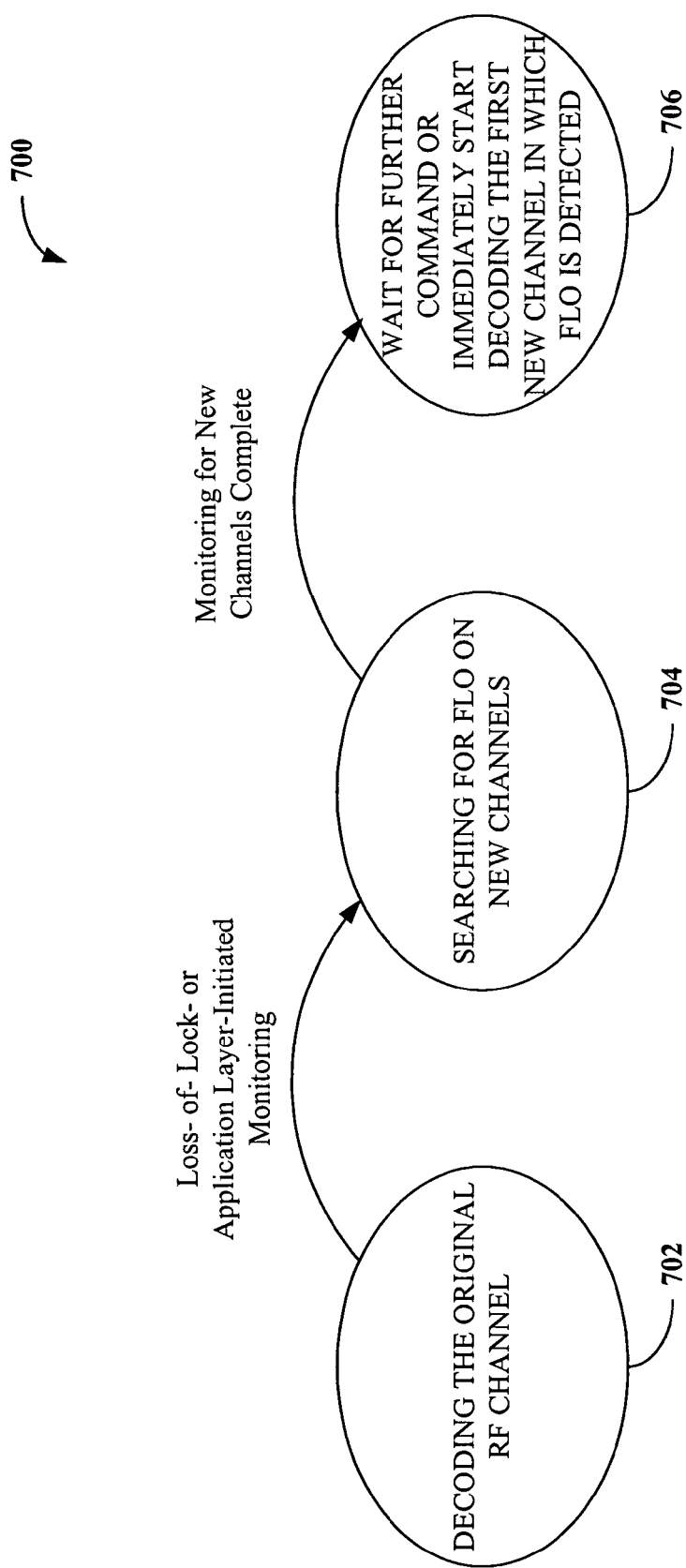
FIG. 7 illustrates a high-level state transition diagram for FLO cannel monitoring, in accordance with one or more aspects.

FIG. 7 illustrates a high-level state transition diagram 700 for FLO cannel monitoring, in accordance with one or more aspects. At 702, an original RF channel may be decoded. Upon an occurrence of a loss of lock, or upon application layer-initiated monitoring, FLO signal searching can be initiated on new RF channels, at 704. Upon completion of new channel monitoring, at 706, further instruction can be awaited. According to another aspect, at 706, decoding of a first channel over which a FLO signal is detected can begin.

In conjunction with the preceding figures, for the loss of lock based monitoring, all approaches of FLO signal searching can be applied. Following a period during which the RF circuit switches to the new channel, two OFDM symbols may be used for the acquisition of the DC and AGC blocks for the new channel. If it is determined by the searching scheme that FLO service is available, demodulation of the new FLO signal may be initiated. The RF switching and settling time may be, for example, approximately 5 ms, which is insignificant compared to the superframe duration of 1 second. If a FLO signal is available on the new channel, the wait time until a next occurrence of a TDM Pilot 1 can be up to 1 second, and therefore the TDM Pilot 1 detection timeout $T_{TDM1}$ can be predefined to be approximately 1 second.

The monitoring of new channels can also be initiated by the application layer. For instance, software can issue a command to monitor new RF channels, and decoding and/or video playing of the original channel may be terminated as a result. As in loss of lock-based monitoring, the key parameters for the original FLO channel need not be restored, and any of the FLO signal searching methods 300, 400, and/or 500 may be employed. Considerations made for the loss of lock based monitoring are also applicable in this scenario.

Figure 8:
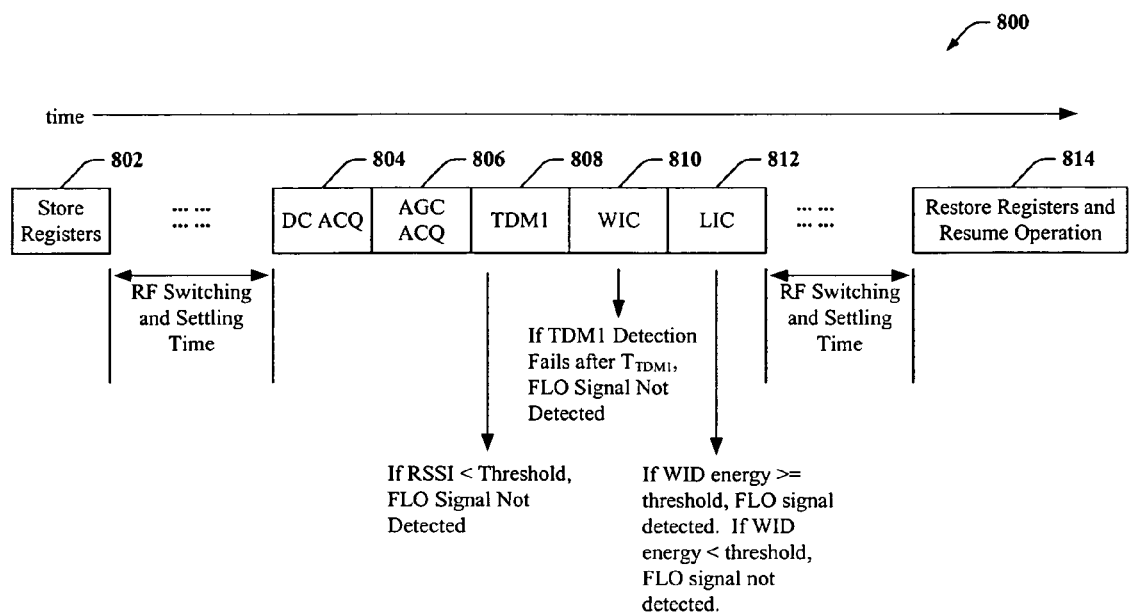
FIG. 8 illustrates a timeline for performing background monitoring with a WID energy-based FLO signal detection method, according to one or more aspects.
Figure 9:
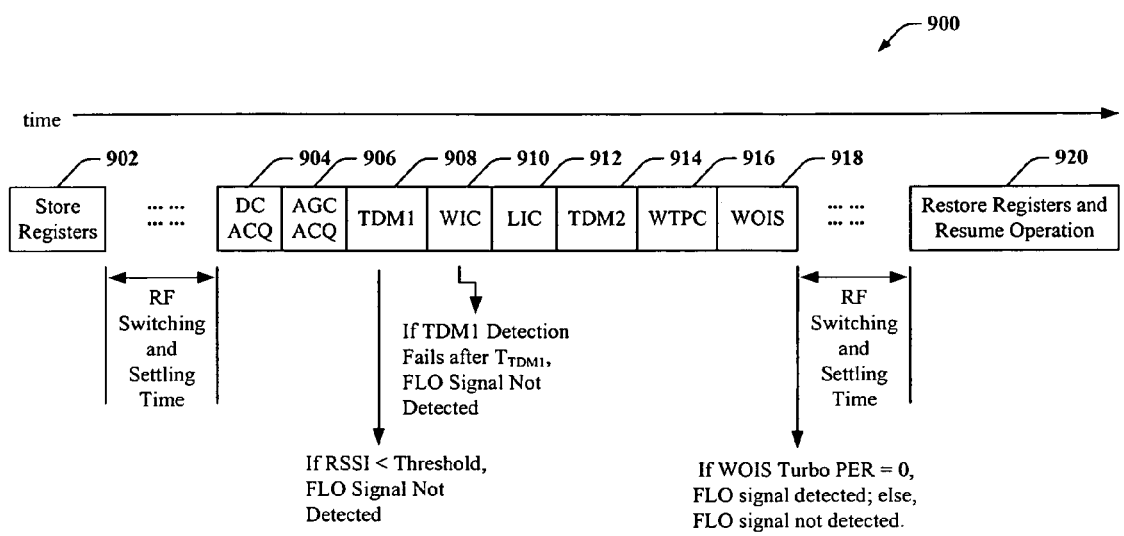
FIG. 9 illustrates a timeline for performing background monitoring with a WOIS-PER-based FLO signal detection method, according to one or more aspects.
Figure 10:
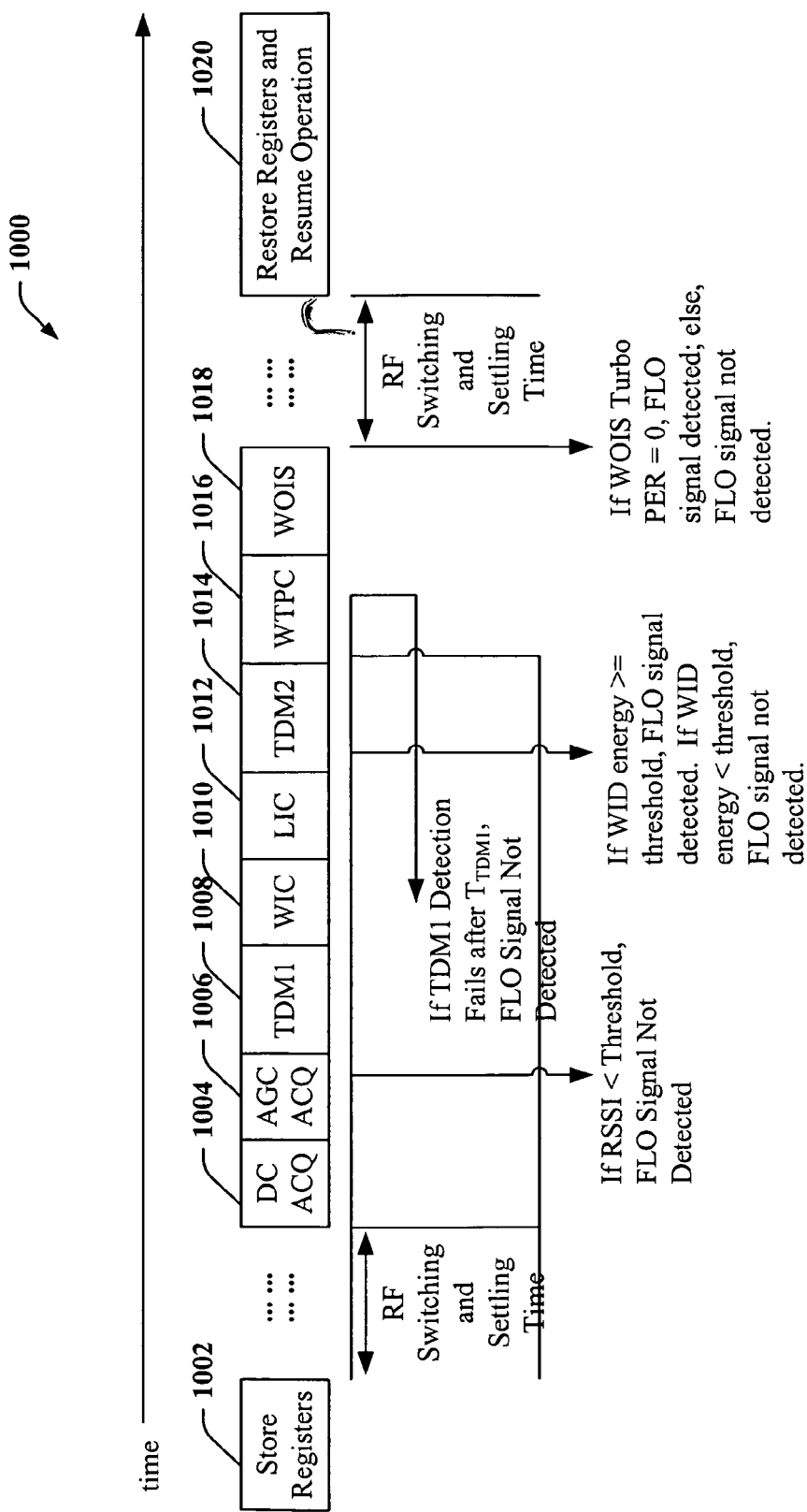
FIG. 10 is an illustration of a timeline for performing background monitoring with a combined WID-energy-and-WOIS-PER-based FLO signal detection method, according to one or more aspects.

FIGS. 8-10 relate to background monitoring of RF channels in conjunction with one or more FLO signal detection methods presented herein. For instance, a receiver can monitor, in the background, the new channels on the list retrieved from a control channel without disturbing the decoding of the current RF channel. According to an example, it may be assumed that FLO signals on different RF channels are superframe synchronized. In such a case, the receiver can have knowledge of the next expected TDM Pilot 1 instant on the new RF channel so that it can switch the RF circuit to the new frequency at an appropriate time. Because the decoding on the original channel should not be adversely impacted, the TDM Pilot 1 detection timeout $T_{TDM1}$ size can be maintained within a predefined size range to mitigate affecting multi-level coded segments (MLCs) close to the beginning of Frame 1. For instance, $T_{TDM1}$ can be set to be zero, such that if TDM Pilot 1 is not detected at the expected time, the sought FLO signal is declared unavailable and the receiver can immediately switch back to the original channel. To accommodate the residual timing offset of different RF channels (e.g., on the order of approximately one hundred microseconds), $T_{TDM1}$ can also be chosen to be one OFDM symbol duration.

The RF circuit may be switched approximately $T_{Settle}+T_{DCAcq}+T_{AGCAcq}$ before the next expected TDM Pilot 1, where $T_{Settle}$ is the RF settling time, $T_{DCAcq}$ is one OFDM symbol duration for DC acquisition, and $T_{AGCAcq}$ is one OFDM symbol duration for AGC acquisition. For the original channel, any MLC scheduled during the time when the receiver operates on the new RF channel will not be received (the "black-out" time for the original channel). This will have an impact only on the MLCs close to the end of Frame 4. The minimum length of the "black-out" period is given by the sum of the RF switching/settling time and two OFDM symbol durations (e.g., for DC and AGC acquisition). For a nominal period of 5 ms of the RF switching and settling time, the minimum "black-out" period is approximately 8 OFDM symbol durations. For benign channel conditions, based on the packets received from Frames 1, 2, and 3, the impacted code blocks can still be correctly decoded by implementation of, for instance, a Reed-Solomon outer code. Therefore, under non-extreme channel conditions and code blocks scheduled close to the end of frames, receiver performance will not be detrimentally affected. The effect of the "black-out" period of approximately 8 symbols also depends on the number of PPC (Positioning Pilot Channel) symbols located at the end of the superframe. For non-zero numbers of PPC symbols, such as 6, 10, 14, any negative impact associated with the "black-out" period at the end of Frame 4 may be further reduced.

Background monitoring may be initiated by the application layer. On the other hand, its initiation can be reception-quality dependent. For instance, the receiver can start background monitoring of new RF channels when the reception on the original channel is of low quality (e.g., below a predetermined threshold level, . . . ). The reception quality can be determined to be low if the RSSI is below a certain threshold, if the packet erasure rate is higher than a certain threshold, etc. Periodically, a list of the RF channels with FLO services determined by the background monitoring may be fed back to the software, which can then initiate a switch to one of the new channels. To save receiver power consumption, during the RF circuit switching and settling time the digital baseband blocks following the sigma delta A/D can be turned off. The rate at which the receiver monitors a new RF channel can be variable. The maximum rate can be such that one new channel is monitored every superframe in Frame 4. To further conserve receiver power consumption, the background monitoring can also happen once every few superframes. The monitoring of new channels can also be initiated when the FLO receiver is in idle mode (not decoding any FLO signal), which is similar to the loss of lock-based or the application layer-initiated monitoring. As such, the considerations made for those scenarios are applicable.

FIG. 8 illustrates a timeline 800 for performing background monitoring with a WID energy-based FLO signal detection method, according to one or more aspects. For instance, timeline 800 can be viewed in conjunction with methodology 300, described above. During a "store registers" time period block 802, registers associated with an original RF channel may be stored. After RF channel switching and settling (e.g., approximately 5 ms), a DC acquisition block 804 is illustrated, during which a DC component associated with a new RF channel may be removed. DC acquisition block 804 is followed by an AGC acquisition block 806, during which gain control information can be evaluated. A TDM1 block 808 defines a period $T_{TDM1}$ during which detection of a first pilot, TDM Pilot 1, may be attempted. During this period, a determination may be made regarding whether RSSI for the particular RF channel is less than a predetermined threshold. If so, then a conclusion can be made that a FLO signal is not present in the RF channel. TDM1 block 808 is followed in time by a WIC block 810, during which a conclusion may be drawn that a FLO signal is not present in the RF channel if no pilot has been detected during the $T_{TDM1}$. During an LIC block 812, an evaluation of the WID energy detected during block 810 may be performed. If WID energy is determined to be greater than or equal to a predetermined threshold, then a FLO signal has been successfully detected. If not, then an assumption can be made that no FLO signal was detected in the current RF channel. After another RF switching and settling period, registers may be restored and operation may be resumed, at block 814. Resuming operation may comprise, for instance, resuming communication over an RF channel in which a FLO signal has been detected, performing another iteration of FLO signal detection in the event that a FLO signal has not been detected, or the like.

FIG. 9 illustrates a timeline 900 for performing background monitoring with a WOIS-PER-based FLO signal detection method, according to one or more aspects. For instance, timeline 900 can be viewed in conjunction with methodology 400, described above. A "store registers" time period block 902 is depicted, wherein registers associated with an original RF channel may be stored. After a period during which RF channel switching and settling occurs (e.g., approximately 5 ms), a DC acquisition block 904 is illustrated, during which a DC component associated with a new RF channel may be removed. DC acquisition block 904 may be followed by an AGC acquisition block 906, during which gain control information can be assessed and/or evaluated. A TDM1 block 908 corresponds to a period $T_{TDM1}$, during which detection of a pilot, TDM Pilot 1, may be attempted. During this period, a determination may be made regarding whether an RSSI for the particular RF channel is below a predetermined threshold. If so, then a FLO signal is deemed not to be present in the current RF channel. TDM1 block 908 is followed by a WIC block 910, during which a conclusion may be drawn that a FLO signal is not present in the RF channel, in the event that no pilot has been detected during the $T_{TDM1}$.

WIC block 910 can be followed by a LIC block 912, a TDM2 block 914, a WTPC block 916, and a WOIS block 918, in a manner similar to that described above with regard to FIG. 6. Upon termination of the WOIS block, a determination can be made regarding whether WOIS Turbo PER is equal to zero, in which case a FLO signal has been detected. If the WOIS PER is not equal to zero, then no FLO signal has been detected. After another RF switching and settling period, registers may be restored and another operation may be resumed, at block 920. Resuming operation may comprise, for instance, resuming communication over an RF channel in which a FLO signal has been detected, performing another iteration of FLO signal detection in the event that a FLO signal has not been detected, or the like.

FIG. 10 is an illustration of a timeline 1000 for performing background monitoring with a combined WID-energy-and-WOIS-PER-based FLO signal detection method, according to one or more aspects. For instance, timeline 1000 can be viewed in conjunction with methodology 500, described above. A "store registers" time period block 1002 is depicted, during which registers associated with an original RF channel may be stored. After a period during which RF channel switching and settling occurs (e.g., approximately 5 ms), a DC acquisition block 1004 is illustrated, during which a DC component associated with a new RF channel may be removed. DC acquisition block 1004 is followed by an AGC acquisition block 906, during which gain control information can be retrieved and/or evaluated. A TDM1 block 1008 corresponding to a period $T_{TDM1}$ during which detection of a pilot, TDM Pilot 1, may be attempted follows AGC acquisition block. During period $T_{TDM1}$, an RSSI for the particular RF channel may be evaluated to assess whether it is below a predetermined threshold. If so, then a FLO signal is deemed not to be present in the current RF channel. TDM1 block 1008 is followed by a WIC block 1010, during which a conclusion may be drawn that a FLO signal is not present in the RF channel, in the event that no pilot has been detected during the $T_{TDM1}$.

WIC block 1010 can be followed by a LIC block 1012, during which WID energy detected during WIC block 1010 can be assessed to determine whether it is greater than or equal to a predetermined threshold value. If the determination indicates that WID energy is at or above the predetermined threshold value, then a FLO signal has been detected. If the detected WID energy level is below the predetermined threshold, then no FLO signal has been detected in the current RF channel. LIC block is followed by a TDM2 block 1014, a WTPC block 1016 that facilitates estimating a channel for WOIS decoding, and a WOIS block 1018, in a manner similar to that described above with regard to FIG. 6. Upon termination of WOIS block 1018, a determination can be made regarding whether WOIS Turbo PER is equal to zero, in which case a FLO signal has been detected. If the WOIS PER is not equal to zero, then no FLO signal has been detected.

After another RF switching and settling period, registers may be restored and operation may be resumed, at block 1020. It will be appreciated that resuming operation may comprise, for instance, resuming communication over an RF channel in which a FLO signal has been detected, performing another iteration of FLO signal detection in the event that a FLO signal has not been detected, or any other suitable operation.

Figure 11:
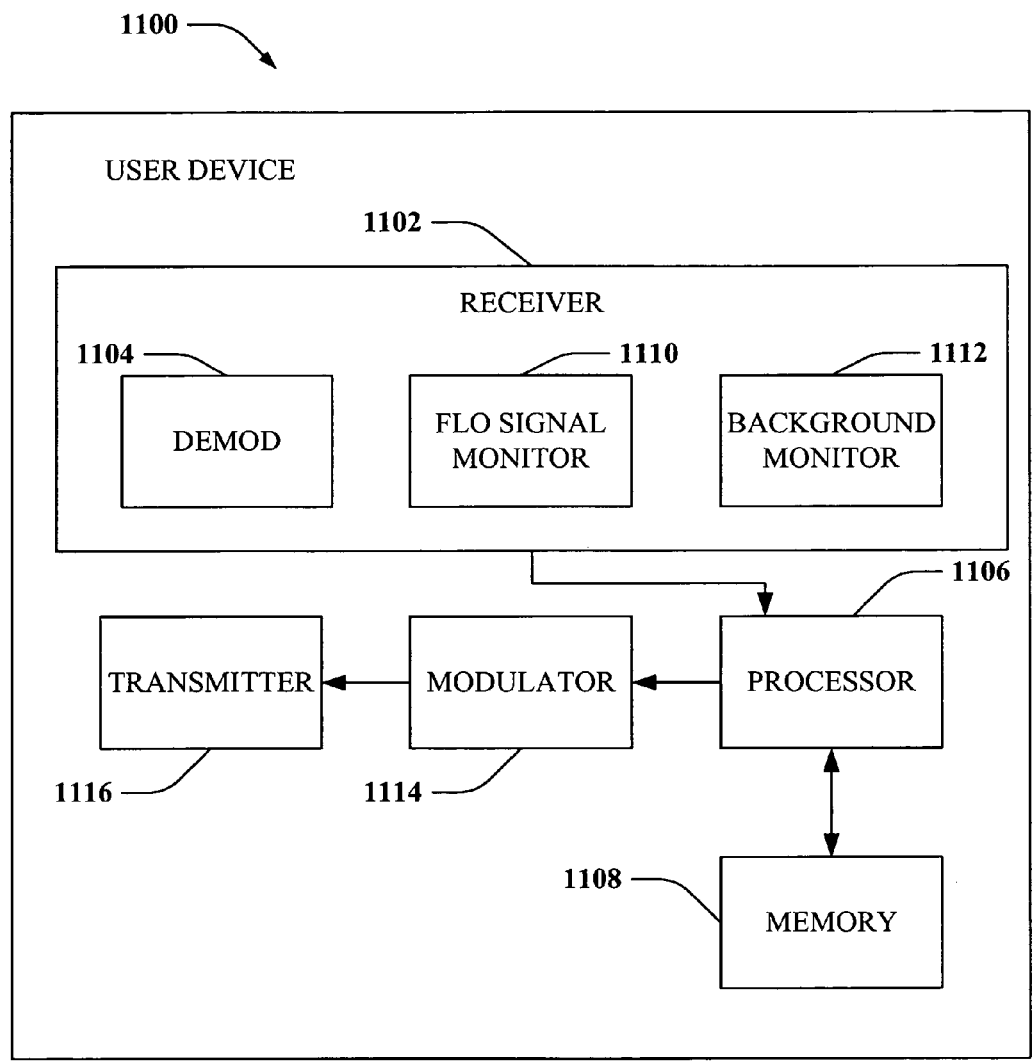
FIG. 11 is an illustration of a user device that facilitates FLO channel monitoring and/or switching over a FLO channel in a wireless communication environment, in accordance with one or more aspects set forth herein.

FIG. 11 is an illustration of a user device 1100 that facilitates FLO channel monitoring and/or switching over a FLO channel in a wireless communication environment, in accordance with one or more aspects set forth herein. User device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. A demodulator 1104 can demodulate and provide received pilot symbols to a processor 1106 for channel estimation. Processor 1106 can be a processor dedicated to analyzing information received by receiver 1102 and/or generating information for transmission by a transmitter 1116, a processor that controls one or more components of user device 1100, and/or a processor that both analyzes information received by receiver 1102, generates information for transmission by transmitter 1116, and controls one or more components of user device 1100.

User device 1100 can additionally comprise memory 1108 that is operatively coupled to processor 1106 and that stores information related to RF channel identity, TDM pilot information associated therewith, TDM pilot counter adjustments, lookup table(s) comprising information related thereto, and any other suitable information for supporting monitoring and/or switching RF channels to provide seamless information display to a user in a wireless communication system as described herein. Memory 1108 can additionally store protocols RF channel monitoring, RF channel switching, etc., such that user device 1100 can employ stored protocols and/or algorithms to perform the various methods described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 can further comprise a FLO channel monitor 1110 that facilitates initiating monitoring of new FLO RF channels upon, for instance, a loss-of-lock occurrence, as described above. Additionally and/or alternatively, FLO channel monitor 1110 can perform application-initiated FLO channel monitoring, also as described with regard to preceding figures. Receiver 1102 can still further comprise a background monitor 1112 that performs various actions related to background monitoring of one or more RF channels. For example, background monitor 1112 can enforce several constraints related to the DC, AGC, AFC, and timing blocks, in order to restore the receiver operation on the original channel when an RF frequency is switched back.

For example, with regard to a DC block, before switching to a new RF channel, coarse and fine loop accumulators (and/or other registers) associated with a current RF channel may be stored in memory 1108. Such loop accumulators may be recovered after switching back to the original channel. Regarding an AGC block, AGC gain state and DVGA loop accumulator value for a current channel may be stored before switching and recovered upon switching back. For an AFC block, an outer loop frequency accumulator may be frozen (e.g., stored) after switching to a new channel and before switching back to an original channel. Because the RF is switched only temporarily to search for FLO signal, the outer loop update may be associated with a temperature-compensated voltage control crystal oscillator (TCVCXO) when operating on the new channel and the inner loop may be employed to track, for instance, residual frequency error and Doppler for the new channel. The frequency accumulator of the inner loop may be stored to memory 1108 before switching to the new channel and may be recovered after switching back to the original channel, upon which the outer loop may be updated again to facilitate resuming operation on the original channel. For the timing block, and in view of the fact that the above-described FLO searching methods detect the TDM Pilot 1 on the new channel, the TDM Pilot 1 counter adjustment, which may be expressed as, for instance:

4625−OldSampleCounterBeforeTDM1+NewSampleCounterAfterTDM1 may be stored to memory 1108 after TDM Pilot 1 is detected on the new channel, and may be undone before the channel is switched back to the original frequency. Whether using the WOIS PER method or the combined WID/WOIS method for FLO signal searching, the TDM Pilot 2 for new channel is always processed so that a TDM Pilot 2 counter adjustment for the new channel may also be stored and undone before switching back to an original channel. In this manner, receiver 1102 can perform a plurality of RF channel monitoring functions in conjunction with FLO signal searching and/or switching to facilitate improved user experience and seamless reception of streaming data or the like.

Figure 12:
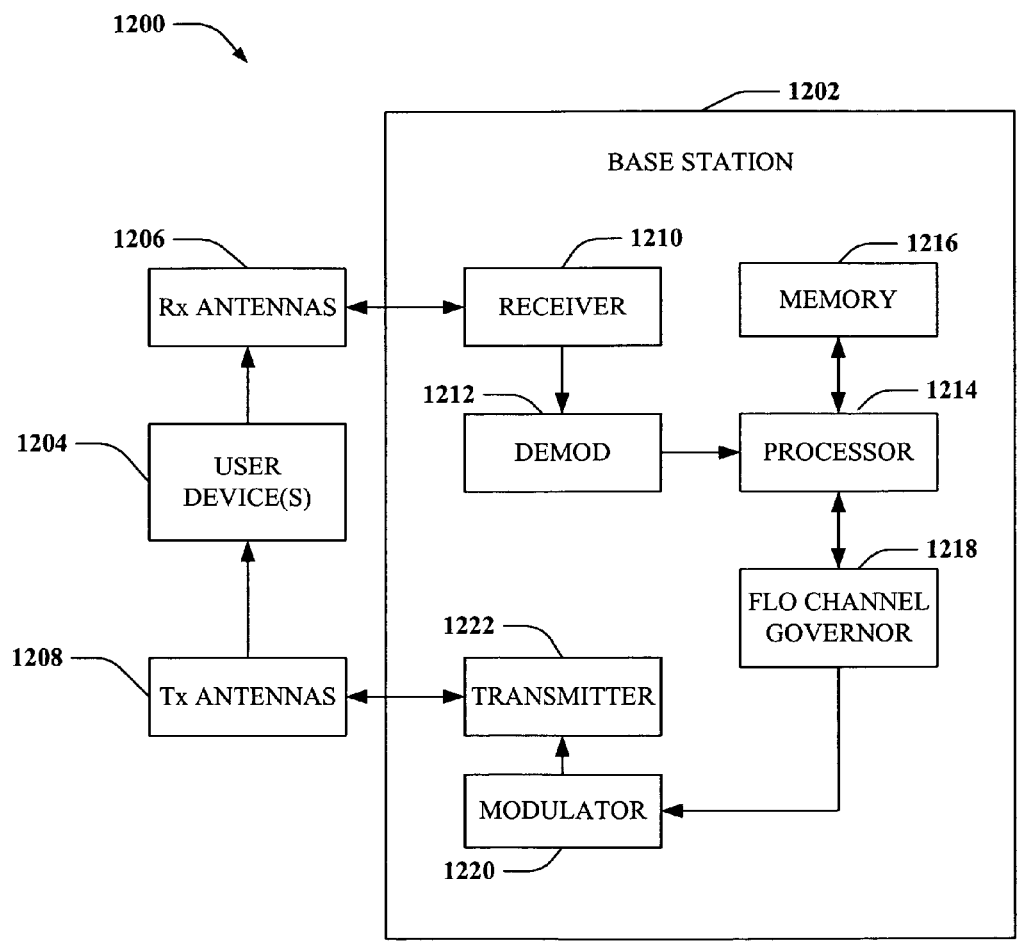
FIG. 12 is an illustration of a system that facilitates providing multiple RF channels in a wireless communication environment in accordance with various aspects.

FIG. 12 is an illustration of a system 1200 that facilitates providing multiple RF channels in a wireless communication environment in accordance with various aspects. System 1200 comprises a base station 1202 with a receiver 1210 that receives signal(s) from one or more user devices 1204 through a plurality of receive antennas 1206, and a transmitter 1222 that transmits to the one or more user devices 1204 through a transmit antenna 1208. Receiver 1210 can receive information from receive antennas 1206 and is operatively associated with a demodulator 1212 that demodulates received information. Demodulated symbols are analyzed by a processor 1214 that is similar to the processor described above with regard to FIG. 11, and which is coupled to a memory 1216 that stores information related to user identities, RF channel frequencies, data transmitted over RF channels, lookup tables related thereto, and/or any other suitable information related to performing the various actions and functions set forth herein. Processor 1214 is further coupled to a FLO channel governor 1218 that synchronizes superframe transmissions on multiple RF channels, which can facilitate RF channel switching by user device(s) 1204 as described with regard to preceding figures. A modulator 1220 can multiplex a signal for transmission by transmitter 1222 through transmit antenna 1208 to user device(s) 1204. In this manner, base station 1202 can interact with user device(s) 1204 to permit RF channel switching, FLO signal detection, channel monitoring, etc.

Figure 13:
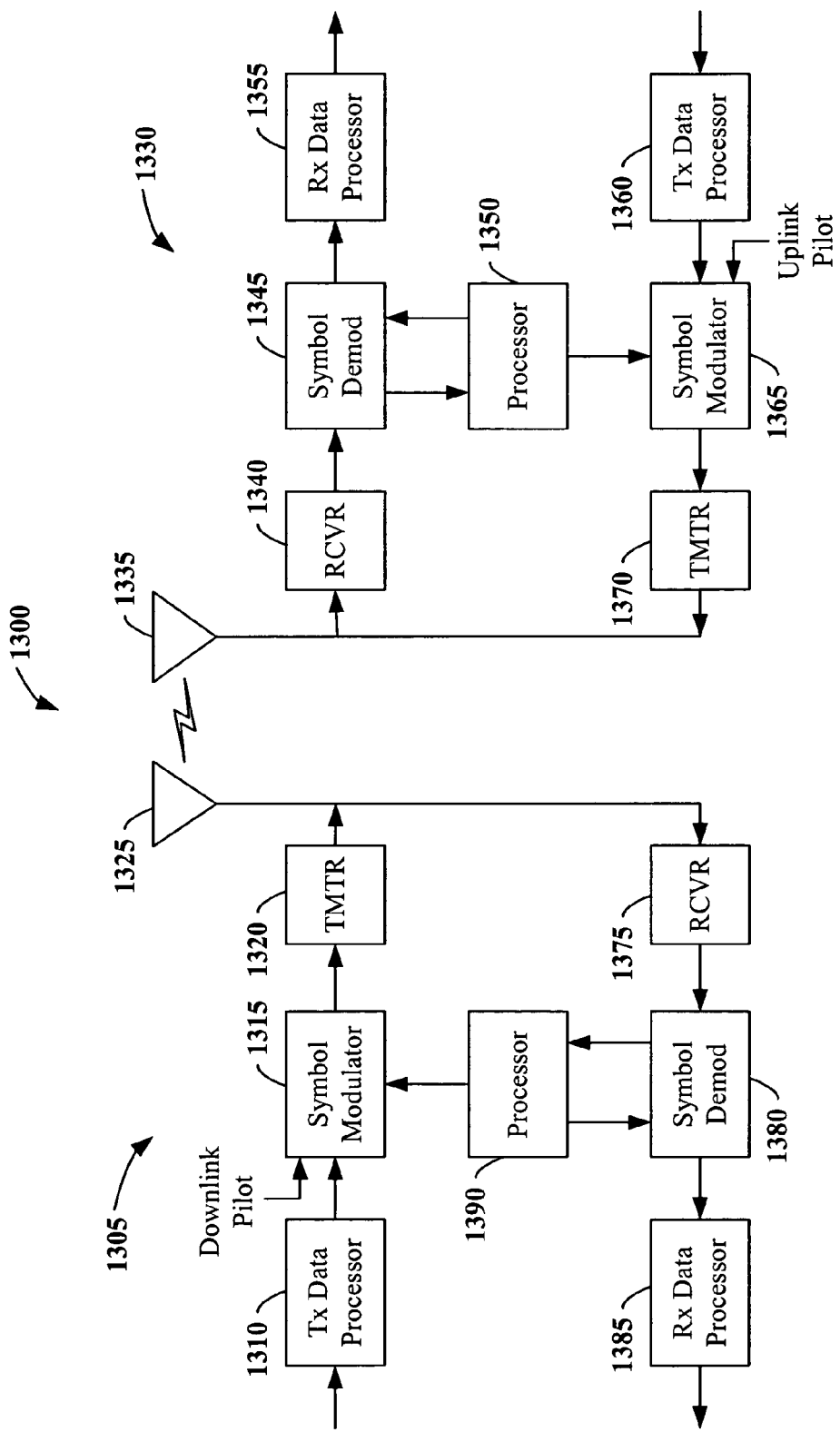
FIG. 13 is an illustration of a wireless network environment that can be employed in conjunction with the various systems and methods described herein.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1, 2, and 6-13) and/or methods (FIGS. 3-5) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols and provides them to a transmitter unit (TMTR) 1320. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of detecting a forward link only (FLO) signal in a radio frequency (RF) in a wireless communication environment, comprising:
    determining whether a monitoring condition exists while accessing a first FLO signal via a current RF channel compatible with a first channel access method, wherein the monitoring condition is a condition that indicates desirability of accessing another FLO signal via another RF channel; and
    in response to a determination that said monitoring condition exists, monitoring at least one new RF channel to determine whether a second FLO signal is present therein, the at least one new RF channel also compatible with the first channel access method.

2. The method of claim 1, wherein the monitoring condition comprises at least one of a loss-of-lock event or an application-initiated monitoring event.

3. The method of claim 1, wherein background monitoring of the at least one new RF channel is performed according to a predetermined schedule that is at least one of continuous and periodic.

4. The method of claim 1, further comprising attempting to detect a time-division multiplexed (TDM) pilot.

5. The method of claim 4, further comprising initiating a counter to zero to detect the TDM pilot.

6. The method of claim 5, further comprising incrementing the counter.

7. The method of claim 6, further comprising determining whether the TDM pilot has been detected.

8. The method of claim 7, further comprising further incrementing the counter if the TDM pilot is not detected.

9. The method of claim 7, further comprising determining whether a counter value is greater than a value associated with the TDM pilot if the TDM pilot is detected.

10. The method of claim 9, further comprising concluding that the second FLO signal is not present in the new RF channel if the counter value is greater than the TDM pilot value.

11. The method of claim 9, further comprising determining whether a late-detection attempt is to be initiated if the counter value is not greater than the TDM pilot value.

12. The method of claim 11, further comprising re-incrementing the counter and attempting to detect the TDM pilot if a late-detection attempt is initiated.

13. The method of claim 11, further comprising evaluating an energy level associated with a wide area identification (WID) channel if no late-detection attempt is initiated and comparing the WID channel energy level to a predetermined threshold.

14. The method of claim 13, further comprising determining whether the WID channel energy level is greater than a predetermined threshold level.

15. The method of claim 14, further comprising concluding that the second FLO signal is not present in the new RF channel if the WID channel energy level is not greater than the threshold level.

16. The method of claim 14, further comprising concluding that the second FLO signal is present in the new RF channel if the WID channel energy level is greater than the threshold level.

17. The method of claim 16, further comprising permitting channel switching from a current RF channel to the new RF channel.

18. The method of claim 14, further comprising determining whether a decoding error has occurred during decoding of a wide area overhead information symbol (WOIS) if the WID energy level is greater than the threshold level.

19. The method of claim 18, further comprising concluding that the second FLO signal is not present in the new RF channel if a decoding error has occurred.

20. The method of claim 18, further comprising concluding that the second FLO signal is present in the new RF channel if a decoding error has not occurred.

21. The method of claim 20, further comprising permitting channel switching from a current RF channel to the new RF channel.

22. The method of claim 11, further comprising determining whether a decoding error has occurred during decoding of a wide area overhead information symbol (WOIS) if no late-detection attempt is initiated.

23. The method of claim 22, further comprising concluding that the second FLO signal is not present in the new RF channel if a decoding error has occurred.

24. The method of claim 22, further comprising concluding that the second FLO signal is present in the new RF channel if a decoding error has not occurred.

25. The method of claim 24, further comprising permitting channel switching from a current RF channel to the new RF channel.

26. The method of claim 1, further comprising determining whether a wide area identification channel energy level is above a predetermined threshold level to determine whether the second FLO signal is present in the at least one new RF channel.

27. The method of claim 1, further comprising determining whether a decoding error has occurred during decoding of a wide area overhead information symbol to determine whether the second FLO signal is present in the at least one new RF channel.

28. The method of claim 1, wherein the first FLO signal on the current RF channel and the second FLO signal the at least one new RF channel are superframe-synchronized.

29. The method of claim 1, wherein the first FLO signal and the second FLO signal represent a same content or represent different contents.

30. An apparatus that facilitates detecting a forward link only (FLO) signal in a monitored radio frequency (RF) channel in a wireless communication environment, comprising:
a receiver that monitors, upon a determination that a monitoring condition exists, at least one new RF channel while receiving a first FLO signal over a current RF channel, wherein the monitoring condition is a condition that indicates a desirability of accessing another FLO signal, wherein the receiver is further configured to monitor the at least one new RF channel for a second FLO signal;
a memory that stores information related to the RF channels; and
a processor coupled to the memory, wherein the processor is configured to determine whether the monitoring condition exists while accessing the first FLO signal, and wherein the processor is further configured to enable switching between the current RF channel and the at least one new RF channel.

31. The apparatus of claim 30, wherein the monitoring condition comprises at least one of a loss-of-lock event or an application-initiated FLO detection event.

32. The apparatus of claim 30, the receiver further comprises a background monitor that monitors the at least one new RF channel to determine whether the second FLO signal is present therein.

33. The apparatus of claim 32, wherein the background monitor receives a list of new RF channels via a control channel.

34. The apparatus of claim 32, wherein the background monitor performs RF channel monitoring continuously.

35. The apparatus of claim 32, wherein the background monitor periodically attempts to detect the second FLO signal in the at least one new RF channel at least once per superframe.

36. The apparatus of claim 30, wherein the receiver determines whether a wide area identification channel energy level is above a predetermined threshold level to determine whether the second FLO signal is present in the at least one new RF channel.

37. The apparatus of claim 30, wherein the receiver determines whether a decoding error has occurred during decoding of a wide area overhead information symbol to determine whether the second FLO signal is present in the at least one new RF channel.

38. The apparatus of claim 30, wherein the first FLO signal on the current RF channel and the second FLO signal the at least one new RF channel are superframe-synchronized.

39. The apparatus of claim 30, wherein the first FLO signal and the second FLO signal represent a same content or represent different contents.

40. A wireless communication apparatus, comprising:
means for receiving a first forward link only (FLO) signal over a current radio frequency (RF) channel;
means for determining whether a monitoring condition exists while accessing the first FLO signal via the current RF channel, wherein the monitoring condition is a condition that indicates desirability of accessing another FLO signal via another RF channel;
means for monitoring a new RF channel in response to a determination that the monitoring condition exists, wherein the current RF channel and the new RF channel are compatible with a first channel access method;
means for determining whether a second FLO signal is present in the new RF channel; and
means for switching between the current RF channel and the new RF channel when the second FLO signal is determined to be present in the new RF channel.

41. The apparatus of claim 40, wherein the monitoring condition comprises at least one of a loss-of-lock on the current RF channel or an application-initiated monitoring of the new RF channel.

42. The apparatus of claim 40, further comprising means for performing background monitoring of the new RF channel, wherein the new RF channel is selected from a list of available RF channels received via a control channel.

43. The apparatus of claim 40, further comprising means for evaluating a wide area identification (WID) channel energy level for the new RF channel.

44. The apparatus of claim 43, further comprising means for comparing the WID channel energy level to a threshold level to determine whether the new RF channel contains the second FLO signal.

45. The apparatus of claim 40, further comprising means for determining whether a wide area information overhead symbol (WOIS) decoding error has occurred to assess whether the new RF channel comprises the second FLO signal.

46. The apparatus of claim 40, wherein the first FLO signal on the current RF channel and the second FLO signal on the new RF channel are superframe-synchronized.

47. The apparatus of claim 40, wherein the first FLO signal and the second FLO signal represent a same content or represent different contents.

48. A computer-readable medium having stored thereon computer-executable instructions for:
receiving a first forward link only (FLO) signal over a current radio frequency (RF) channel;
determining whether a monitoring condition exists while accessing the first FLO signal via the current RF channel, wherein the monitoring condition is a condition that indicates desirability of accessing another FLO signal via another RF channel;

monitoring at least one other RF channel in response to a determination that the monitoring condition exists;

determining whether a second FLO signal is present in the at least one other RF channel; and switching between the current RF channel and the at least one other RF channel when the second FLO signal is determined to be present in the at least one other RF channel, wherein the current RF channel and the at least one other RF channel are compatible with a first channel access method.

49. The computer-readable medium of claim 48, wherein the monitoring condition comprises at least one of a loss-of-lock on the current RF channel or an application-initiated monitoring of the at least one other RF channel.

50. The computer-readable medium of claim 48, further comprising instructions for performing background monitoring of the at least one other RF channel, wherein the at least one other RF channel is selected from a list of available RF channels received via a control channel.

51. The computer-readable medium of claim 48, further comprising instructions for evaluating a wide area identification (WID) channel energy level for the at least one other RF channel.

52. The computer-readable medium of claim 51, further comprising instructions for comparing the WID channel energy level to a threshold level to determine whether at least one other RF channel contains the second FLO signal.

53. The computer-readable medium of claim 48, further comprising instructions for determining whether a wide area information overhead symbol (WOIS) decoding error has occurred to assess whether the at least one other RF channel comprises the second FLO signal.

54. The computer-readable medium of claim 48, wherein the first FLO signal on the current RF channel and the second FLO signal on the at least one other RF channel are superframe-synchronized.

55. The computer-readable medium of claim 48, wherein the first FLO signal and the second FLO signal represent a same content or represent different contents.

56. A processor that executes instructions for increasing throughput in a wireless communication environment, comprising:

a first forwarding processing unit that controls receiving a first forward link only (FLO) signal over a current radio frequency (RF) channel;

a second processing unit that determines whether a monitoring condition exists while accessing the first FLO signal via the current RF channel, wherein the monitoring condition is a condition that indicates desirability of accessing another FLO signal via another RF channel;

a third processing unit that controls monitoring a second RF channel in response to a determination that the monitoring condition exists;

a fourth processing unit that controls determining whether a second FLO signal is present in the second RF channel; and a fifth processing unit that controls switching between the current RF channel and the second RF channel when the second FLO signal is determined to be present in the second RF channel, wherein the current RF channel and the second RF channel are compatible with a first channel access method.

57. The processor of claim 56, wherein the monitoring condition comprises at least one of a loss-of-lock on the current RF channel or an application-initiated monitoring of the second RF channel.

58. The processor of claim 56, wherein the third processing unit is further configured for performing background monitoring of the second RF channel, wherein the second RF channel is selected from a list of available RF channels received via a control channel.

59. The processor of claim 56, wherein the fourth processing unit is further configured for evaluating a wide area identification (WID) channel energy level for the second RF channel.

60. The processor of claim 59, wherein the fourth processing unit is further configured for comparing the WID channel energy level to a threshold level to determine whether the second RF channel contains the second FLO signal.

61. The processor of claim 56, wherein the fourth processing unit is further configured for determining whether a wide area information overhead symbol (WOIS) decoding error has occurred to assess whether the second RF channel comprises the second FLO signal.

62. The processor of claim 56, wherein the first FLO signal on the current RF channel and the second FLO signal on the second RF channel are superframe-synchronized.

63. The processor of claim 56, wherein the first FLO signal and the second FLO signal represent a same content or represent different contents.

* * * * *